US012780659B2

(12) United States Patent
Zone

(10) Patent No.: US 12,780,659 B2
(45) Date of Patent: Nov. 3, 2026

(54) PROCESS AND APPARATUS FOR XENON AND OR KRYPTON RECOVERY

(71) Applicant: Air Products and Chemicals, Inc., Allentown, PA (US)

(72) Inventor: Ian Zone, Surrey (GB)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 631 days.

(21) Appl. No.: 18/196,527

(22) Filed: May 12, 2023

(65) Prior Publication Data

US 2024/0375958 A1 Nov. 14, 2024

(51) Int. Cl.
*C01B 23/00* (2006.01)

(52) U.S. Cl.
CPC ................................ *C01B 23/0036* (2013.01)

(58) Field of Classification Search
CPC .. F25J 2205/30; F25J 2235/50; F25J 2250/40; F25J 2250/50; F25J 2290/62; F25J 3/04745
See application file for complete search history.

(56) References Cited

U.S. PATENT DOCUMENTS 3,896,471 A 7/1975 Najarian
4,568,528 A 2/1986 Cheung
5,067,976 A 11/1991 Agrawal et al.
5,122,173 A 6/1992 Agrawal et al.
5,309,719 A 5/1994 Agrawal et al.
6,164,089 A 12/2000 Sweeny et al.
6,658,894 B2 12/2003 Golden et al.
6,694,775 B1 2/2004 Higginbotham et al.
6,735,980 B2 5/2004 Cook et al.
6,843,973 B2 1/2005 Griffiths et al.
6,848,269 B2 * 2/2005 Higginbotham ..... F25J 3/04745 62/925
7,285,154 B2 10/2007 Karwacki, Jr. et al.
7,594,955 B2 * 9/2009 Ishihara ................. B01D 53/02 95/95
8,443,625 B2 * 5/2013 Prosser ................ F25J 3/04412 62/925
8,795,411 B2 8/2014 Hufton et al.
11,150,016 B2 * 10/2021 Hirose ................. F25J 3/04187
11,325,878 B2 * 5/2022 Langley ................. B01D 3/143
11,460,246 B2 * 10/2022 Luo ...................... B01D 5/0063
(Continued)

FOREIGN PATENT DOCUMENTS

DE 697728 C 10/1940

*Primary Examiner* — Filip Zec
(74) *Attorney, Agent, or Firm* — Matthew R. Weaver

(57) ABSTRACT

Recovering xenon and/or krypton from a feed gas can include utilization of a purge stream from a separation column positioned and configured to output at least one stream of fluid that is substantially nitrogen and at least one stream of fluid that is substantially oxygen. The purge stream can be split so that a first portion of the purge stream is fed as a liquid adjacent to a top of a purge treatment column and a second portion of the purge stream can be fed to a heat exchanger for superheating the second portion to feed a superheated vapor at or adjacent to a bottom of the purge treatment column. The purge treatment column can output a liquid stream that has a relatively high concentration of Xe and/or Kr therein as a feed stream for an Xe and/or Kr recovery system.

10 Claims, 3 Drawing Sheets

(56) References Cited

U.S. PATENT DOCUMENTS

| | | | | |
|---|---|---|---|---|
| 11,897,833 | B2 * | 2/2024 | Langley | B01D 3/06 |
| 2006/0021380 | A1 * | 2/2006 | Jaouani | F25J 3/04678 62/643 |
| 2007/0044507 | A1 * | 3/2007 | Wanner | F25J 3/0409 62/925 |
| 2013/0152628 | A1 * | 6/2013 | Find | B01D 3/106 62/620 |
| 2015/0119609 | A1 * | 4/2015 | Deshmukh | B01D 3/34 210/195.1 |
| 2019/0241493 | A1 * | 8/2019 | Phelps | B01D 3/143 |
| 2022/0357104 | A1 * | 11/2022 | O'Connor | F25J 3/04169 |
| 2024/0166511 | A1 * | 5/2024 | Bhadra | B01D 53/0462 |

* cited by examiner

PROCESS AND APPARATUS FOR XENON AND OR KRYPTON RECOVERY

TECHNICAL FIELD

The present innovation relates to processes utilized to recover fluids from air or an industrial gas, gas separation plants configured to recover xenon and/or krypton from at least one feed gas, air separation plants, air separation systems, systems utilizing multiple columns to recover xenon and/or krypton fluid in addition to nitrogen, argon, and/or oxygen fluids, and methods of making and using the same.

BACKGROUND

Air separation processes can be configured to recover rare gases such as xenon (Xe) or krypton (Kr) as well as other elements. U.S. Pat. Nos. 3,596,471, 4,568,528, 5,067,976, 5,122,173, 5,309,719, 6,164,089, 6,658,894, 6,735,980, 6,843,973, 6,848,269, 7,285,154, and 8,795,411 disclose examples of such systems.

Krypton, and xenon can be recovered as secondary products in the cryogenic separation of air into oxygen and/or nitrogen products. Because air contains only 1.14 and 0.087 parts per million by volume (ppmv) of krypton and xenon, respectively, recovery of these components by the cryogenic separation of air can be technically complex and costly. Recovery is often further complicated by the presence of light hydrocarbons (e.g. methane) in the air feed of an air separation plant.

BRIEF SUMMARY OF THE INVENTION

I have determined that typical xenon (Xe) and krypton (Kr) recovery systems use a concentrating column with a reboiler system for forming a feed for feeding to the recovery system for recovery of the Xe and/or Kr. Concentrating columns use a reboiler to form vapor for the separation of the feed in order to concentrate the Xe and/or Kr in the feed to be used for Kr and/or Xe recovery. The Xe within such a feed to the concentrating column system is often in the 10 ppmv to 40 ppmv range, for example. I determined that the concentration factor in this concentrating column can be severely constrained by the levels of undesired impurities (e.g. carbon dioxide, nitrous oxide, and/or hydrocarbons) in the column reboiler, which must be limited to avoid safety issues that may result from reboiling a fluid having a significant amount of oxygen within the fluid (e.g. energy release and/or fire). Typically, this is avoided by the use of an upstream adsorption based system to reduce the concentration of the aforementioned impurities in the feed stream to this column.

I have further determined that avoiding the need for a column reboiler can allow for a more efficient and lower cost process as the reboiler can be very expensive due to the material properties and other elements of a reboiler needed for heating a fluid that has a substantial amount of oxygen content. This is particularly true when the aforementioned impurities are present in substantial levels.

To avoid use of a reboiler, I determined that superheating of a portion of a feed stream external to a column can permit the reboiler of the column to be avoided and also provide other improvements in forming a feed for an Xe and/or Kr recovery system. Further, I determined that the superheating that may occur upstream of the purge column to allow for the removal of the reboiler can be done more efficiently and safely because the concentration of undesired impurities in the fluid being heated is much lower as it occurs prior to an increase in concentration that occurs as a desirable consequence of being treated in the column.

Embodiments of apparatuses and processes for recovery of Xe and/or Kr are provided that can permit treatment of a flow of purge fluid output from an air separation unit (e.g. a purge fluid output from a reboiler-condenser of an ASU or a purge stream from a column assembly of the ASU) so that the purge fluid is split into a first portion and a second portion. The second portion of the purge fluid can be fed adjacent to the top of a purge treatment column (which can also be referred to herein as a purge column) and the first portion of the purge fluid can be superheated and subsequently fed as a superheated vapor at or adjacent to the bottom of the purge treatment column. The purge treatment column can be operated to output a liquid feed that is more suitable for a Xe and/or Kr recovery system. The purge column can avoid the use of a reboiler so that no reboiler is utilized in the purge treatment column for formation of the feed to be provided to a Xe and/or Kr recovery system.

Other embodiments of apparatuses and processes for recovery of Xe and/or Kr are provided that can permit treatment of a flow of purge fluid output from an air separation unit (e.g. a purge fluid output from reboiler-condenser of an ASU or a purge stream from a column assembly of the ASU) so that the purge fluid is fed to a purge column and a first liquid feed from a plant process or other source is fed to a top of the purge column or adjacent the top of the purge column. A first portion of the purge fluid (e.g. an entirety of it in some implementations) can be superheated and subsequently fed as a superheated vapor at or adjacent to the bottom of the purge column. The purge column can be operated to output a liquid feed that is more suitable for a Xe and/or Kr recovery system. The purge column can avoid the use of a reboiler so that no reboiler is utilized in the purge column for formation of the feed to be provided to a Xe and/or Kr recovery system.

I have determined that embodiments can be operated such that the feed for the Xe and/or Kr recovery system that is output from such a purge column can have significantly higher concentrations of Xe and/or Kr. For example, in some embodiments the concentration of Xe within the feed for Xe and/or Kr recovery that is formed can be as high as 200 ppmv Xe to 500 ppmv Xe or in a range of greater than 50 ppmv Xe and less than or equal to 450 ppmv Xe. As another example, the Kr in the formed feed for Xe and/or Kr recovery can be in the 100 ppmv Kr to 3, 100 ppmv Kr range or a range of greater than 110 ppmv Kr and less than 3,100 ppmv Kr. In contrast, the purge liquid itself may only provide a feed to the Xe and/or Kr recovery system that has between 10 ppmv Xe and 60 ppmv Xe. Such higher concentrations of Xe and/or Kr in the feed can also be provided with improved safety by removal of the reboiler as well as other improvements in operational efficiency and capital cost reduction.

I determined that configuring such a system without use of a reboiler can permit operations to occur with a higher tolerance for impurities such as hydrocarbons, carbon dioxide, and nitrous oxide as well because other downstream processes in the Xe and/or Kr recovery can remove such undesired impurities without affecting the feed creation process for the feed of the Xe and/or Kr recovery system. Moreover, I determined that allowing for the increased level of impurities can permit reduction in the amount of gas that may be in the formed Xe and/or Kr recovery system feed that is formed with the increased concentration of the rare elements (Xe and Kr), which can significantly reduce the size of downstream processing equipment that may be used in the Xe and/or Kr recovery or can allow the Xe and/or Kr recovery system to provide significantly improved operational efficiency and throughput.

In a first aspect, a process for xenon (Xe) and/or krypton (Kr) recovery can include superheating a first portion of a purge stream to form a superheated vapor, feeding the superheated vapor to a bottom of the purge column or adjacent the bottom of the purge column; feeding a second portion of the purge stream or a purge column liquid feed to a top of a purge column or adjacent the top of the purge column, outputting a Xe and/or Kr recovery feed stream from the purge column for feeding to an Xe and/or Kr recovery system.

The purge column can be a concentrating column. The purge stream that can be fed to the purge column can be a purge stream or other process stream output from an ASU or a column assembly of an ASU. For example, embodiments of the process can utilize a purge stream that is liquid, mostly liquid, entirely liquid, or a colder vapor that is below a superheated temperature for the stream. In some embodiments, the purge stream can be substantially comprised of oxygen and also include other constituents. For instance, in some embodiments, the purge stream can comprise greater than 60 mole percent (mol %) oxygen, between 5 parts per million by volume (ppmv) Xe and 15 ppmv Xe and between 10 ppmv and 30 ppmv Kr.

In a second aspect, the purge stream can be provided by a storage unit that received the purge stream from at least one separation plant or the purge stream can be provided by a column assembly of at least one separation plant (e.g. an air separation unit, etc.).

In a third aspect, the second portion of the purge stream can be fed to the top of the purge column or adjacent to the top of the purge column and be entirely liquid. Alternatively, the process can include providing a purge column liquid feed to the top of a purge column or adjacent the top of the purge column and the first portion of the purge stream that is superheated to form the superheated vapor may be an entirety of the purge stream.

In a fourth aspect, the process can include outputting a purge vapor stream from the purge column. The purge vapor stream can be utilized in other plant processes as a heat exchange medium, a regeneration gas, and/or be vented in some embodiments.

In a fifth aspect, the Xe content of the Xe and/or Kr recovery feed stream can be relatively highly concentrated. For example, the Xe content of the Xe and/or Kr recovery feed stream can be between 50 parts per million by volume (ppmv) Xe and 500 ppmv Xe.

In a sixth aspect, the Kr content of the Xe and/or Kr recovery feed stream can be relatively highly concentrated. For example, the Kr content of the Xe and/or Kr recovery feed stream can be between 100 ppmv Kr and 3, 100 ppmv Kr.

In a seventh aspect, the superheating of the first portion of the purge stream can be performed to superheat the first portion to a temperature that is between −110° C. and −130° C. to form the superheated vapor. Other embodiments may utilize other pre-selected superheated vapor temperature ranges.

In an eighth aspect, the purge column can be operated at an elevated pressure. For example, embodiments of the process can include operating the purge column at a pressure of between 8 bar absolute (bara) and 15 bara, between 6 bara and 15 bara, or between about 5 bara and 15 bara.

In a ninth aspect, the feeding of the second portion of the purge stream or the purge column liquid feed to the top of the purge column or adjacent the top of the purge column can include splitting the purge stream to form the first portion of the purge stream and the second portion of the purge stream and feeding the second portion of the purge stream to the top of the purge column or adjacent the top of the purge column.

In a tenth aspect, the superheating of the first portion of the purge stream to form the superheated vapor can be performed via a heater that is external to the purge column. The heater can include a heat exchanger and a heating medium of the heat exchanger can be ambient air or a process stream output from an air separation unit (ASU) in some embodiments. In other embodiments, the heater can include an electric heater or other type of heater.

In an eleventh aspect, the process can include recovering an Xe product stream and/or a Kr product stream from the Xe and/or Kr recovery feed stream via the Xe and/or Kr recovery system.

In a twelfth aspect, the operation of the purge column and the feeding of the purge stream to the purge column can be performed without use of an upstream adsorber for removal of impurities. For example, embodiments of the process in which the purge column operates at an elevated pressure (e.g. 6 bara to 15 bara, 5 bara to 15 bara, or 8 bara to 15 bara, etc.) can be provided so that relatively high impurity concentrations can be tolerated at the purge column so that no upstream adsorption system is needed for impurity removal prior to the purge stream being fed to the purge column.

In a thirteenth aspect, the process of the first aspect can include one or more features of a combination of the second aspect, third aspect, fourth aspect, fifth aspect, sixth aspect, seventh aspect, eighth aspect, ninth aspect, tenth aspect, eleventh aspect, and/or twelfth aspect. It should therefore be appreciated that embodiments of the process can include various other features, process steps and/or elements, examples of which can be appreciated from the discussion of exemplary embodiments provided herein.

In a fourteenth aspect, an apparatus for xenon (Xe) and/or krypton (Kr) recovery can include a purge column positioned to receive a purge stream output from a column assembly of an air separation unit (ASU) and a heater positioned between the purge column and the ASU to receive a first portion of the purge stream to superheat the first portion to form a superheated vapor and feed the superheated vapor to a bottom of the purge column or adjacent the bottom of the purge column. The purge column can be configured to output a Xe and/or Kr recovery feed stream for feeding to an Xe and/or Kr recovery system.

Embodiments of the apparatus can be configured to implement one or more embodiments of the process. Embodiments of the apparatus can be configured so that a purge stream that is liquid, mostly liquid, entirely liquid, or a colder vapor that is below a superheated temperature is the purge stream to be received at the heater and/or purge column. In some embodiments, the purge stream can be substantially comprised of oxygen and also include other constituents. For example, in some embodiments, the purge stream can comprise greater than 60 mol % oxygen, between 5 parts per million by volume (ppmv) Xe and 15 ppmv Xe and between 10 ppmv and 30 ppmv Kr.

In a fifteenth aspect, the purge column can be positioned and configured to facilitate concentration of Xe and Kr into the Xe and/or Kr recovery feed stream and operate at a pressure of between 8 bar absolute (bara) and 15 bara or between 6 bara and 15 bara. Other embodiments may utilize other purge column operational pressures (e.g. between 5 bara and 15 bara, etc.).

In a sixteenth aspect, the apparatus can be configured so that the Xe content of the Xe and/or Kr recovery feed stream can be between 50 ppmv Xe and 500 ppmv Xe and/or the Kr content of the Xe and/or Kr recovery feed stream can be between 100 ppmv Kr and 3,100 ppmv Kr. Other embodiments can be adapted for other concentration ranges for Xe and Kr as well.

In a seventeenth aspect, the apparatus can be configured so that the heater is external to the purge column and is configured as an electric heater or a heat exchanger. For example, the heater can be external to the purge column and be a heat exchanger that is positioned to receive a heating medium for superheating the first portion. This heating medium can be, for example, ambient air, a process stream from the ASU, or other plant process stream that can be routed to the heat exchanger for functioning as the heating medium.

In an eighteenth aspect, the purge stream can be output from a multi-column assembly of the ASU and can be comprised of at least 60 mol % oxygen and can have between 1 parts per million by volume (ppmv) and 15 ppmv Xe and between 5 ppmv and 30 ppmv Kr. The purge stream can alternatively be outputtable or output from another type of ASU and have other types of oxygen, Xe, and KR concentrations in other embodiments.

In a nineteenth aspect, the apparatus can include a splitting mechanism positioned upstream of the heater and also positioned between the purge column and the ASU. The splitting mechanism can be configured to receive the purge stream and split the purge stream to form the first portion of the purge stream and a second portion of the purge stream such that the second portion of the purge stream is feedable to a top of the purge column or adjacent the top of the purge column. In some embodiments, the first portion can be between 90% and 70% of the purge stream and the second portion can be between 10% and 30% of the purge stream.

In a twentieth aspect, the apparatus can include a storage unit positioned between the heater and the ASU to receive the purge stream for subsequently feeding the purge stream to the purge column and a splitting mechanism positioned upstream of the heater and also positioned between the purge column and the ASU, and also positioned between the purge column and the storage unit. The splitting mechanism can be configured to receive the purge stream and split the purge stream to form the first portion of the purge stream and a second portion of the purge stream such that the second portion of the purge stream is feedable to a top of the purge column or adjacent the top of the purge column. In some embodiments, the first portion of the purge stream can be between 90% and 70% of the purge stream and the second portion of the purge stream can be between 10% and 30% of the purge stream.

In a twenty-first aspect, the apparatus of the fourteenth aspect can include one or more features of a combination of the fifteenth aspect, sixteenth aspect, seventeenth aspect, eighteenth aspect, nineteenth aspect, twentieth aspect, and/or twenty-first aspect. It should therefore be appreciated that embodiments of the apparatus can include various other features and configurations, examples of which can be appreciated from the discussion of exemplary embodiments provided herein.

Other elements can also be included in embodiments of the system or apparatus and/or used in embodiments of the process for recovery of Xe and/or Kr. For instance, one or more pumps, vessels, conduits, or other units can also be utilized in embodiments of the system or apparatus. Also, embodiments can utilize one or more process control systems to meet a particular set of design criteria. For instance, embodiments may utilize sensors (e.g., pressure sensors, temperature sensors, flow rate sensors, concentration sensors, etc.), controllers, valves, piping, and other process control elements. Some embodiments can utilize an automated process control system and/or a distributed control system (DCS).

Other details, objects, and advantages of processes utilized to recover xenon and/or krypton, gas separation plants configured to recover xenon and/or krypton in addition to nitrogen, argon and/or oxygen from at least one feed gas, air separation plants, air separation systems, systems utilizing multiple columns to recover xenon and/or krypton in addition to nitrogen, and/or argon, and/or oxygen fluids, apparatuses configured to provide a feed obtained from at least one purge stream output from an air separation unit for xenon and/or krypton recovery that can provide a substantially increased concentration of xenon and krypton in the formed feed, and plants utilizing such systems or processes, and methods of making and using the same will become apparent as the following description of certain exemplary embodiments thereof proceeds.

BRIEF DESCRIPTION OF THE DRAWINGS

Exemplary embodiments of processes for recovering xenon and/or krypton from air or an industrial gas, apparatuses and processes configured to provide a feed obtained from at least one purge stream output from an air separation unit for xenon and/or krypton recovery that can provide a substantially increased concentration of xenon and krypton in the formed feed, systems utilizing multiple columns to recover xenon and/or krypton, plants utilizing such systems, and methods of making and using the same are shown in the drawings included herewith. It should be understood that like reference characters used in the drawings may identify like components.

DETAILED DESCRIPTION

Figure 1:
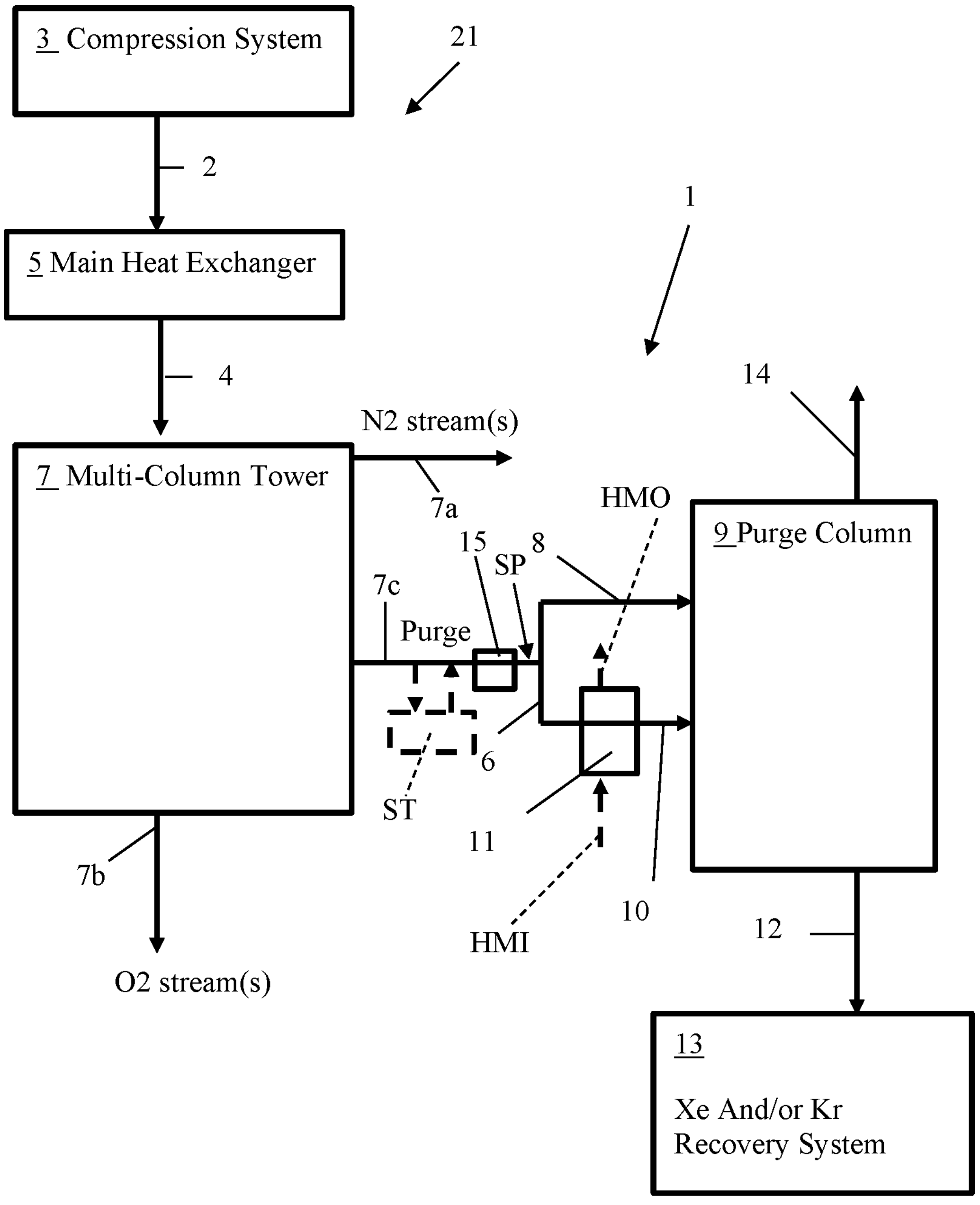
FIG. 1 is a schematic block diagram of a first exemplary embodiment of a plant utilizing a first exemplary embodiment of the apparatus for xenon and/or krypton recovery.
Figure 2:
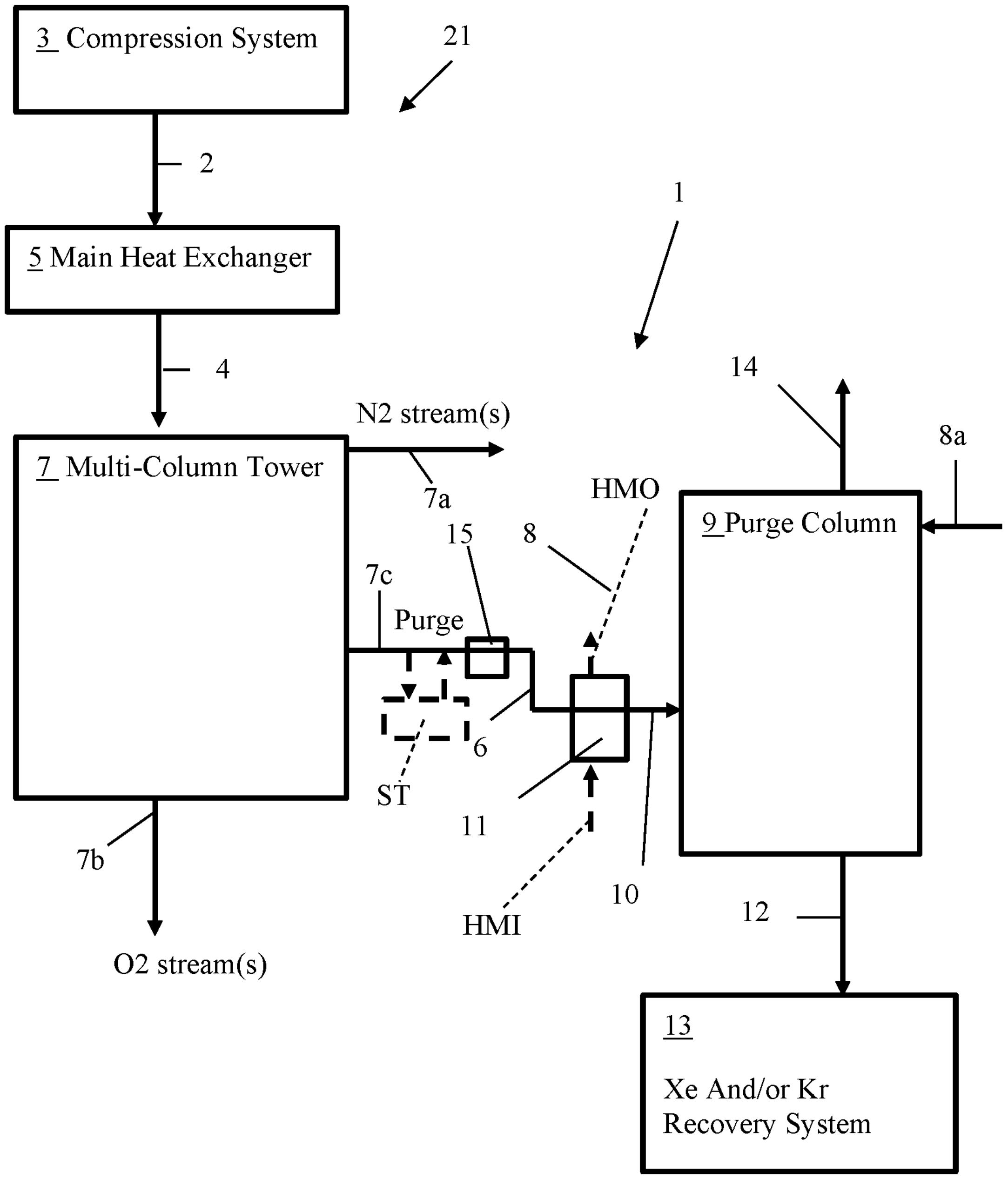
FIG. 2 is a schematic block diagram of a first exemplary embodiment of a plant utilizing a first exemplary embodiment of the apparatus for xenon and/or krypton recovery.
Figure 3:
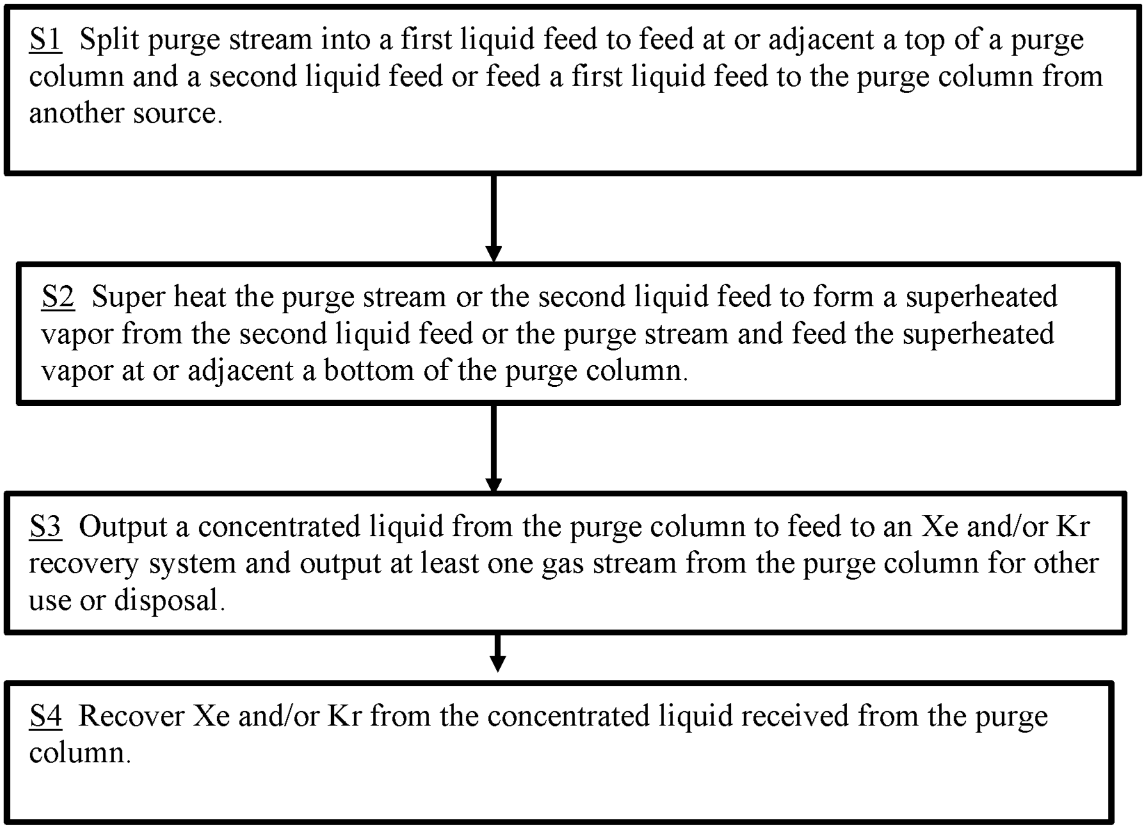
FIG. 3 is a flow chart of an exemplary process for xenon and/or krypton recovery. An embodiment of this process can be implemented in the first exemplary embodiment of the apparatus illustrated in FIG. 1.

Referring to FIGS. 1-3, an apparatus 1 for xenon and/or krypton recovery can be positioned to receive a purge stream 7*c* from a separation plant 21. The separation plant 21 can be configured as an air separation unit (ASU), which can be configured for separation of air or an industrial gas. For example, the separation plant 21 can include a compression system 3 that can be configured to compress and purify a feed gas (e.g. air, an industrial gas, etc.). The compression system 3 can include a feed compressor and a pre-purification unit (PPU) that can include one or more adsorbers configured for temperature swing adsorption (TSA) and/or pressure swing adsorption (PSA), for example.

The compressed and purified gas 2 can be output from the compression system 3 and fed to a main heat exchanger 5 to undergo cooling therein and subsequent separation and purification in a single or multiple column system employing one or more reboiler-condenser units. Product streams such as an oxygen stream **7*b*** (O2 stream(s)) nitrogen stream (s) (N2 stream(s)) as well as others can be output from the single or multi-column system.

For example, a cooled compressed and purified gas stream 4 can be output from the main heat exchanger 5 and fed to a column assembly of the separation plant 21. The column assembly can include, for example, a multi-column tower 7 or other column assembly that can include a first low pressure column and a second high pressure column for separation of the gas into multiple streams. The multiple streams can include, for example, at least one nitrogen stream **7*a* (N2 stream(s)) and at least one oxygen stream 7*b* (O2 stream(s)). Each nitrogen stream 7*a* can be comprised mostly of nitrogen (e.g. include at least 60 mole percent (mol %) nitrogen, include between 80 mol % nitrogen and 100 mol % nitrogen, etc.). Each oxygen stream 7*b*** can be comprised mostly of oxygen (e.g. include at least 60 mol % oxygen, at least 80 mol % oxygen, be between 80 mol % and 100 mol % oxygen, etc.).

The multi-column tower 7 (or other column assembly) can also output a purge stream **7*c*. The purge stream 7*c* can be enriched in oxygen relative to the feed stream. For example, the purge stream 7*c* can be comprised mostly of oxygen (e.g. be over 50 vol % oxygen) or be comprised of a significant amount of oxygen (e.g. over 20 vol % oxygen) and be output as at least one purge stream from the boiling side of at least one reboiler or a reboiler-condenser of the multi-column tower 7 (or other column assembly). The purge stream 7*c* can be required to maintain levels of undesirable impurities (e.g. hydrocarbons, nitrous oxide, carbon dioxide, etc.) at an acceptable level within the boiling side of the reboiler-condenser(s). The purge stream 7*c* can alternatively be another stream output from the multi-column tower 7**.

The purge stream **7*c* can be fed directly toward a purge column 9 for increasing the concentration of Xe and/or Kr or can be fed to a storage unit ST for being stored therein for subsequently being fed to the purge column 9 (as shown in broken line in FIG. 1). The purge column 9 can be a concentrating column in some embodiments. When utilized, the storage unit ST can include one or more storage vessels for storing the fluid of the purge stream 7*c* before the purge stream 7*c* is fed to the purge column 9**.

The storage unit ST can be positioned between the column assembly of at least one separation plant 21 (e.g. ASU) and the purge column 9 for storage of purge fluid and feeding of the purge stream **7*c* to the purge column 9. In some embodiments, the storage unit ST can be positioned to receive purge fluid from multiple different separation plants and subsequently provide that purge fluid to the purge column 9 downstream of the storage unit ST. In other embodiments, the storage unit ST can be positioned on a site with at least one separation plant 21 for intermediate storage of the purge fluid of purge stream 7*c* output from the separation plant 21 before the purge fluid is fed to the purge column 9 as the purge stream 7*c*. In yet other embodiments, the storage unit ST may not be used and the purge fluid can be fed directly toward the purge column 9 as at least one purge stream 7*c* output from the separation plant 21 (e.g. separation plant 21** configured as an ASU, etc.).

The purge stream **7*c* fed to the purge column 9 can be a liquid stream that is comprised of a substantial amount of oxygen or could be a partially liquid stream or a relatively cold vapor stream comprised of a substantial amount of oxygen. For instance, the bulk constituents of the purge stream can be between 50 mol % oxygen and almost 100 mol % oxygen (e.g. over 99 mol % oxygen to 99.999 mol % oxygen, etc.) with the remaining bulk constituents being nitrogen and argon. The purge stream 7*c* can also include a number of other constituents, which can include xenon (Xe), krypton (Kr), argon (Ar), hydrocarbons such as methane, nitrous oxide, and other components. For instance, the purge stream 7*c*** can include between 5 ppmv Xe and 50 ppmv Xe and between 10 ppmv Kr and 100 ppmv Kr.

The purge stream **7*c* can be fed to the apparatus 1 for xenon and/or krypton recovery via a feed conduit arrangement extending from the separation plant 21 or the storage unit ST to the purge column 9. In some embodiments, the purge stream 7*c* can be entirely fed to the purge column 9. FIG. 2 illustrates an example of such a purge column arrangement in which a liquid feed 8*a* is fed to the purge column. This purge column liquid feed 8*a*** can be from another plant process.

In other embodiments, the purge stream **7*c* can be split before it is fed to the purge column 9. FIG. 1 illustrates such an embodiment, for example. In the embodiment of FIG. 1, the purge stream 7*c* can be split into a first portion 6 and a second portion 8 via a splitting mechanism SP (e.g. valve, conduit arrangement, and/or other device for splitting the purge stream 7*c* into the first portion 6 and the second portion 8) positioned upstream of a heater 11 and positioned between the purge column 9 and the separation plant 21. When the storage unit ST is utilized, the splitting mechanism SP can be located between the heater 11 and the storage unit ST and also between the storage unit ST and the purge column 9**.

The second portion 8 of the purge stream **7*c* that is formed via the splitting mechanism SP can be a smaller amount of the purge stream 7*c* than the first portion 6. For instance, the second portion 8 can be split from the first portion 6 such that the second portion 8 is 10% to 30% of the purge stream 7*c* and the first portion is the remaining 90% to 70% of the purge stream 7*c***.

In some embodiments, the purge stream **7*c* can be output at a pressure of 10 bara or other suitable pressure within a pre-selected purge pressure range (e.g. a pressure of less than 20 bara, a pressure of between 15 bara and 8 bara, a pressure of between 15 bara and 5 bara, etc.). In some situations, the purge stream 7*c* can undergo compression via a pump, compressor, or other pressure increasing unit 15 so that the pressure of the purge stream is at a pre-selected purge column feed pressure. The pre-selected purge column feed pressure can be between 15 bara and 8 bara or other suitable pressure so that the increased pressure of the purge stream 7*c* can permit the purge column 9 to run at such an elevated pressure so containments like carbon dioxide and nitrous oxide are significantly more soluble in a liquid phase during operation of the purge stream. This type of pressurization can be performed as needed to help ensure that the purge column output that is to be fed to a Xe and/or Kr recovery 13 can be at a pressure suitable for feeding to the Xe and/or Kr recovery without having to undergo further compression. The temperature of the purge stream 7*c*** can be a suitable temperature that is within a pre-selected purge temperature range (e.g. a temperature of between −140° C. to −160° C., a temperature of between −150° C. and −160° C., or other suitable temperature).

The elevation of pressure of the purge stream **7*c*** to a pre-selected purge column feed pressure can be configured so that the purge column operates at a higher pressure (e.g. 6-12 bara, greater than 8 bara and less than or equal to 15 bara, greater than 5 bara and less than or equal to 15 bara, etc.). This elevated pressure can permit elimination of the need for the adsorption removal unit for operation of the purge column because the higher operational pressure can result in permitting a higher level of impurity concentration for operation of the purge column.

The second portion 8 or the purge column liquid feed 8*a* can be fed to a top of a purge column 9 or can be fed adjacent to the top of the purge column 9. The second portion 8 of the purge stream or the purge column liquid feed 8*a* fed to the purge column 9 can be comprised of liquid or be entirely liquid in some embodiments such that the second portion 8 of the purge stream or the purge column liquid feed 8*a* can pass downwardly through the purge column 9 in a counter-current flow arrangement with a vapor fed to the purge column 9.

The first portion 6 of the purge stream 7*c* can be fed to a heater 11 that is external to the purge column 9 to be heated to form a superheated vapor 10 at a superheated feed temperature within a pre-selected superheated temperature range. The superheated feed temperature can be a suitable superheated feed temperature that can provide sufficient duty for operation of the purge column 9. For instance, the superheated feed temperature can be a temperature that is between 10° C. and 50° C. of superheating to form a superheated vapor 10 at a pre-selected superheated temperature within a pre-selected superheated temperature range (e.g. a temperature of between −120° C. and −130° C., or −120° C. and −140° C., etc.).

The purge column 9 can operate at a pre-selected purge processing operational pressure range. The pre-selected purge processing operational pressure for the purge column can be a pressure that is higher than a pressure at the reboiler-condenser or reboiler of a column assembly that can be the source of the purge stream 7*c*. This pressure range can be a pressure within a range of 5 bara and 15 bara, or other suitable pressure range in some embodiments. Other embodiments may utilize another pre-specified pressure range as well (e.g. 8 bara and 15 bara).

The superheated vapor 10 formed via the external heater 11 can be at a pressure that is above the operational pressure of the purge column 9 (e.g. a pressure of greater than 15 bara when the pre-selected purge processing operational pressure for the purge column is 15 bara, a pressure of greater than 13 bara when the pre-selected purge processing operational pressure for the purge column is 13 bara, etc.).

The heater 11 can be an electric heater or a heat exchanger. When configured as a heat exchanger 11, the heater 11 can receive a heating medium (HMI) flow (shown in broken line in FIG. 1) for heating the first portion 6 of the purge stream to superheat the first portion 6 and form the superheated vapor 10. The heating medium can be output as a cooled heating medium stream (HMO) (shown in broken line in FIG. 1). The heating medium fed to the heater 11 can be an external stream (e.g. ambient air, water, etc.) or an intermediate process stream of the separation plant 21 or a stream output from the separation plant 21 (e.g. a waste stream comprised mostly of nitrogen gas output from the separation plant 21 prior to that gas being vented, etc.).

The superheated vapor 10 output from the heater 11 can be fed to a bottom of the purge column 9 or adjacent to the bottom of the purge column 9 for distillation with the second portion 8 fed to the purge column as a liquid or predominantly as a liquid. The purge column 9 can include one or more stages of separation to help facilitate the concentration of the Xe and Kr in a Xe and/or Kr recovery feed stream 12 output from the purge column 12. The superheated vapor 10 can be fed to the purge column 9 for passing upwardly through the purge column 9 in a counter-current flow arrangement with the liquid of the second portion 8 of the purge stream 7*c* or liquid of the purge column liquid feed 8*a* so that heavy components of the purge stream 7*c* (e.g. the Xe, Kr, etc.) can be concentrated in a Xe and/or Kr recovery feed stream 12 output from the bottom of the purge column 9 or adjacent the bottom of the purge column 9. The extra energy contained in the superheated vapor 10 can provide the duty required to vaporize excess liquid fed into the upper portion of the purge column 9 via the second portion 8 of the purge stream or the purge column liquid feed 8*a*. Because the purge column 9 does not include a reboiler, the purge column 9 can be operated without the concerns associated with boiling an oxygen liquid with relatively large amounts of contamination since the boiling process takes place in the external heater 11 that has a significantly lower concentration of contaminants at the time of the heating upstream of the purge column 9. The Xe and/or Kr recovery feed stream 12 can be output at a temperature within a pre-selected purge column bottom temperature range (e.g. a temperature of between −150° C. and −160° C. or other suitable temperature range, etc.).

The Xe content in the Xe and/or Kr recovery feed stream 12 can be greater than 50 ppmv in some embodiments. For example, the Xe content of the Xe and/or Kr recovery feed stream 12 can be between 50 ppmv Xe and 500 ppmv Xe, 50 ppmv Xe and 450 ppmv Xe, between 100 ppmv Xe and 500 ppmv Xe, 100 ppmv Xe and 450 ppmv Xe, or between 150 ppmv Xe and 450 ppmv Xe in some embodiments. In other embodiments, the Xe content can be greater than 100 ppm, between 100 ppmv Xe and 600 ppmv Xe, or be another Xe content within a pre-selected Xe content range (e.g. a range of 130 ppmv to 500 ppmv or other pre-selected suitable range).

As another example, the Kr content of the Xe and/or Kr recovery feed stream 12 can be between 100 ppmv Kr and 3,000 ppmv Kr, 100 ppmv Kr and 2,850 ppmv Kr, between 600 ppmv Kr and 3,000 ppmv Kr, or between 600 ppmv Kr and 2,900 ppmv Kr in some embodiments. In other embodiments, the Kr content can be greater than 100 ppm, between 100 ppmv Kr and 3,100 ppmv Kr, or be another Kr content within a pre-selected Kr content range (e.g. a range of 260 ppmv to 3,000 ppmv or other pre-selected suitable range).

The Xe and/or Kr recovery feed stream 12 can be liquid or comprised of liquid (e.g. be at least 50% liquid with the non-liquid portion being vapor, be between 50% liquid and 100% liquid with any non-liquid portion being vapor, be between 80% liquid and 100% liquid with any non-liquid portion being vapor, be entirely liquid, etc.) The Xe and/or Kr recovery feed stream 12 output from the purge column 9 can be fed to an Xe and/or Kr recovery system 13. The Xe and/or Kr recovery system 13 can process the Xe and/or Kr recovery feed stream 12 to purify that stream for separation of Xe and/or Kr for formation of Xe and Kr product streams.

The Xe and/or Kr recovery feed stream 12 output from the bottom of the purge column 9 can include these higher levels of Xe and Kr as well as being comprised mostly of oxygen. For example, the Xe and/or Kr recovery feed stream 12 output from the bottom of the purge column 9 can include between 90 mol % oxygen and 99 mol % oxygen, can be between 90 mol % oxygen and 95 mol % oxygen, or be another suitable concentration of oxygen. The Xe and/or Kr recovery feed stream 12 output from the bottom of the purge column 9 can also include nitrogen, hydrocarbons, argon, and other constituents (e.g. the nitrogen can be between 3 mol % and 6 mol % of the steam or be within another suitable range, the argon can be between 0.05 mol % and 0.15 mol % of the stream or be within another suitable range, hydrocarbons can be between 2,000 ppmv and 7,500 ppmv of the stream or within another suitable range, and there can be trace amounts of other constituents, such as carbon dioxide etc. as well).

A purge vapor stream 14 can be output from the top of the purge column 9 or adjacent the purge column 9 as well. The purge vapor stream can be at a pre-selected purge stream temperature (e.g. a temperature of between −150° C. and −160° C., etc.). The purge vapor stream 14 can be comprised substantially of oxygen (e.g. be over 70 mol % oxygen, be over 80 mol % oxygen, be over 95 mol % oxygen, be between 70 mol % oxygen and 100 mol % oxygen or 80 mol % oxygen and 100 mol % oxygen, etc.). The purge vapor stream 14 can also include nitrogen and argon as significant constituents in some embodiments (e.g. nitrogen can be between 5 mol % and 15 mol % of the purge vapor stream 14, etc. and argon can be between 0.5 mol % and 2 mol % of the purge vapor stream 14, etc.). The purge vapor stream 14 can also include other trace constituents as well (e.g. hydrocarbons, carbon dioxide, krypton etc.) and preferably does not contain any xenon or has only a minimal trace amount of xenon. The purge vapor stream 14 is a gaseous stream that can be recycled back to the multi-column tower 7 (or other column assembly) of the separation plant 21, or can be fed to the PPU of the compression system as a regeneration gas, or can be vented, or can be otherwise utilized (e.g. used as a heating medium or cooling medium for at least one heat exchanger prior to being vented or otherwise utilized).

An embodiment of the apparatus 1 for recovery of Xe and/or Kr was evaluated based on assuming a typical hydrocarbon concentration in the purge stream 7*c* feeding the purge column 9. The evaluation that was conducted determined that the purge column 9 can be operated to provide a Xe and/or Kr recovery feed stream 12 that had an acceptable hydrocarbon concentration for feeding to a Xe and/or Kr recovery system 13. The conducted comparison of a conventional approach to forming a feed for an Xe and/or Kr recovery system 13 and utilization of an embodiment of my apparatus for providing the Xe and/or Kr recovery feed stream 12 for a Xe and/or Kr recovery system 13 resulted in finding that a substantially higher concentration of hydrocarbons (total hydrocarbon concentration, THC) can be provided by embodiments of my apparatus while also permitting a lower flow rate of Xe and/or Kr recovery feed fluid to be provided with a much higher concentration of Xe and Kr within the formed feed. In the conducted evaluation, a conventional reboiler based system could provide a flow of feed with 2200 ppmv THC for a feed having 10 ppmv Xe and 20 ppmv Kr. In contrast, an embodiment of my apparatus could provide a Xe and/or Kr recovery feed stream 12 at a flow rate 50% lower than the conventional flow rate (105 $Nm^3$/hr instead of 210 $Nm^3$/hr), with 4000 ppmv THC and an increase in Xe and Kr content; or could provide a Xe and/or Kr recovery feed stream 12 at a flow rate 67% lower than a conventional flow rate (70 $Nm^3$/hr instead of 210 $Nm^3$/hr), with 5600 ppmv THC and a substantial increase in Xe and Kr content. The above evaluation was performed based on assuming that the conventional reboiler would have a maximum allowable value of 2200 ppmv for total hydrocarbon content (THC), which resulted in a maximum product rate for the conventional column arrangement of 210 $Nm^3$/hr.

The conducted evaluation also showed that improved concentrations of Xe and Kr could be obtained with the increased amount of THC. For example, Xe content was found to be increased from 10 ppmv to 40 ppmv Xe to a Xe content of between 67 ppmv Xe to 430 ppmv Xe in the conducted evaluation. As another example, Kr content was able to be increased from 20 ppmv to 400 ppmv to a Kr content of between 119 ppmv to 2,801 ppmv Kr in the conducted evaluation. These improved Kr and Xe concentrations can be provided while also providing improved safety operations by removal of the column reboiler and can provide additional operational efficiencies and operational flexibility as discussed above.

Notably, the conducted evaluation found that embodiments of my apparatus 1 that utilized superheated vapor 10 from external heater 11 could reduce the feed stream flowrate for Xe and/or Kr recovery by as much as 67% because the limit on the allowable concentration of hydrocarbons could be safely raised without concerns associated with a column reboiler, since there is no internal column reboiler in the purge column 9.

Embodiments of my apparatus can be designed and operated to adjust an allowable limit for hydrocarbon content so that this limit is pre-selected to account for any restriction imposed by the downstream processing equipment of the Xe and/or Kr recovery system 13. Conversely, even allowing only the same limit on the concentration of hydrocarbons fed into the downstream equipment, embodiments of my apparatus and process can provide a much safer operation because the oxygen rich column reboiler is eliminated and these are generally considered by industry to be the highest risk area at this step in the Kr/Xe recovery systems due to the risk of an energy release or fire.

Moreover, embodiments of my apparatus and process can be configured to help facilitate debottlenecking opportunities or retrofitting opportunities. For instance, the capacity of downstream equipment in a conventional ASU system can be expanded by simply replacing the Xe and/or Kr recovery feed forming column having a reboiler with an embodiment of my apparatus 1 including the purge column 9 and the external heater 11 to allow more feed to be processed and the recovery of more Xe and/or Kr product from operation of the Xe and/or Kr recovery system 13.

In new construction, embodiments can be provided to permit a reduction in flow as compared to conventional systems, which can allow the downstream equipment of an Xe and/or Kr recovery system 13 to be significantly reduced in size, which can provide a reduction in capital costs as well as fabrication and installation costs of the equipment. Alternatively, by using a sufficiently sized purge column 9 and heater 11, an existing design for the downstream equipment of the Xe and/or Kr recovery system 13 can be used with an ASU of a larger capacity or to process flows from multiple different ASUs, providing capital cost reductions, operational flexibility, and improved recovery of Xe and/or Kr.

For example, depending on the design of the downstream equipment, there can be significant savings in the downstream utility costs by processing a reduced feed flowrate. The significance of such savings can depend on the amount of integration of the downstream equipment with one or more ASUs (e.g. whether the apparatus 1 is integrated with a single ASU, receives feed from multiple ASUs, or is a standalone unit receiving purge stream fluid via transport vehicle).

Embodiments of my apparatus 1 for Xe and/or Kr recovery can be configured to utilize an exemplary embodiment of my process for Xe and/or Kr recovery to form a feed for Xe and/or Kr recovery that has a much higher concentration of Xe and Kr within the formed feed as compared to conventional approaches. An example of such a process is shown in the exemplary embodiment illustrated in FIG. 2. As shown in FIG. 3, an embodiment of my process can include an optional first step S1 that can includes splitting a purge stream into a first liquid feed to feed at or adjacent to a top of a purge column 9 (which can also be referred to as a purge treatment column) and a second liquid feed. The first liquid feed can be the second portion 8 discussed above and the second liquid feed can be the first portion 6 discussed above, for example. Alternatively, the first step S1 can include feeding a first liquid feed to the purge column 9 from another source (e.g. another plant process, etc.). This can occur when no splitting of the purge stream occurs in which a purge column liquid feed 8*a* is fed to the purge column 9 as shown in FIG. 2, for example.

In a second step S2, the second liquid feed (e.g. the first portion 6) or a first portion of the purge stream that may be the entirety of the purge stream 7*c* if no splitting occurs can be heated or superheated to form a superheated vapor 10 from the second liquid feed. The superheated vapor can be fed to the purge column at or adjacent to a bottom of the purge column.

In a third step S3, the purge column 9 can output a concentrated liquid for feeding to an Xe and/or Kr recovery system 13 and also output at least one gas stream for other use or disposal. The concentrated liquid that is output can be or can be included in the Xe and/or Kr recovery feed stream 12, for example. The Xe content in this stream can range from 50 ppmv to 500 ppm, 65 ppmv to 450 ppm, or over 100 ppmv to 450 ppmv in some embodiments. The Kr content in this stream can range from over 100 ppmv Kr to 3,100 ppmv Kr, over 100 ppmv Kr to 2,800 ppmv Kr, or between 200 ppmv Kr to 3,000 ppmv Kr in some embodiments.

In a fourth step S4, the Xe and/or Kr can be recovered from the concentrated liquid received from the purge column 9. The elevated level of hydrocarbons (e.g. hydrocarbon content of greater than 2,600 ppmv to 8,000 ppm, between 4,500 ppmv hydrocarbons and 8,000 ppmv hydrocarbons or other suitable hydrocarbon content range etc.) that can be included within the Xe and/or Kr recovery feed stream 12 can be removed via purification elements of the recovery system used to recover the Xe and/or Kr. Such a removal of these elevated levels of impurities can be provided at the Xe and/or Kr recovery system 13 via use of one of many different process elements or purification processes that are conventionally employed for such purification and separation.

Embodiments of my process can also include other steps or features. For example, the process can also include retrofitting an embodiment of my apparatus into a pre-existing ASU plant, industrial gas separation plant, or Xe and/or Kr recovery plant. As yet another example, embodiments of my process can also include adjusting operation of the purge column and/or splitting of the purge stream 7*c* to form the first and second portions to accommodate a pre-selected set of operational criteria. As yet another example, the extent to which the second liquid feed is superheated (e.g. superheated to a temperature that is greater than a baseline superheated temperature by a range of 5° C.-50° C. etc.) can be adapted to account for a pre-selected set of operational criteria.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the plant for fluid communication of the flows of fluid between different units can be arranged to meet a particular plant layout design that accounts for available area of the plant, sized equipment of the plant, and other design considerations. For instance, the size and configuration of any heat exchanger, compressor, columns, or conduits utilized in an embodiment can be modified to meet a particular set of design criteria. As another example, the flow rate, pressure, and temperature of the fluid passed through one or more heat exchangers as well as passed through other plant elements can vary to account for different plant design configurations and other design criteria. As yet another example, the number of plant units and how they are arranged can be adjusted to meet a particular set of design criteria. As yet another example, the material composition for the different structural components of the units of the apparatus and the plant can be any type of suitable materials as may be needed to meet a particular set of design criteria.

It should be appreciated that embodiments of the apparatus can be configured for inclusion in an air separation plant or other type of plant. The apparatus can be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the processes utilized to recover xenon and/or krypton, gas separation plants, air separation plants, air separation systems, plants utilizing such systems or processes, and methods of making and using the same have been shown and described above, it is to be distinctly understood that the invention is not limited thereto but may be otherwise variously embodied and practiced within the scope of the following claims.

What is claimed is:

1. A process for xenon (Xe) and/or krypton (Kr) recovery, comprising:

superheating a first portion of a purge stream to form a superheated vapor;

feeding the superheated vapor to a bottom of the purge column or adjacent the bottom of the purge column;

feeding a second portion of the purge stream or a purge column liquid feed to a top of a purge column or adjacent the top of the purge column; and outputting a Xe and/or Kr recovery feed stream from the purge column for feeding to an Xe and/or Kr recovery system;

wherein the purge stream comprises greater than 60 mole percent (mol %) oxygen, between 5 parts per million by volume (ppmv) Xe and 15 ppmv Xe and between 10 ppmv and 30 ppmv Kr, the purge stream being provided by a storage unit that received the purge stream from at least one separation plant or the purge stream being provided by a column assembly of at least one separation plant; and wherein the second portion of the purge stream fed to the top of the purge column or adjacent to the top of the purge column is entirely liquid.

2. The process of claim 1, comprising:

outputting a purge vapor stream from the purge column.

3. The process of claim 1, wherein an Xe content of the Xe and/or Kr recovery feed stream is between 50 parts per million by volume (ppmv) Xe and 500 ppmv Xe.

4. The process of claim 1, wherein the superheating of the first portion of the purge stream is performed to superheat the first portion to a temperature that is between-110° C. and −130° C. to form the superheated vapor.

5. The process of claim 1, comprising:

operating the purge column at a pressure of between 6 bar absolute (bara) and 15 bara.

6. The process of claim 1, wherein the feeding the second portion of the purge stream or the purge column liquid feed to the top of the purge column or adjacent the top of the purge column comprises:

splitting the purge stream to form the first portion of the purge stream and the second portion of the purge stream; and feeding the second portion of the purge stream to the top of the purge column or adjacent the top of the purge column.

7. The process of claim 1, wherein a Kr content of the Xe and/or Kr recovery feed stream is between 100 parts per million by volume (ppmv) Kr and 3, 100 ppmv Kr.

8. The process of claim 1, wherein the superheating of the first portion of the purge stream to form the superheated vapor is performed via a heater that is external to the purge column.

9. The process of claim 8, wherein the heater is a heat exchanger and a heating medium of the heat exchanger is ambient air or a process stream output from an air separation unit (ASU).

10. The process of claim 1, comprising:

recovering an Xe product stream and/or a Kr product stream from the Xe and/or Kr recovery feed stream via the Xe and/or Kr recovery system.

* * * * *